April 14, 1953     R. HENDERSON ET AL     2,634,521
DRAGLINE SCRAPER
Filed June 2, 1948     2 SHEETS—SHEET 1
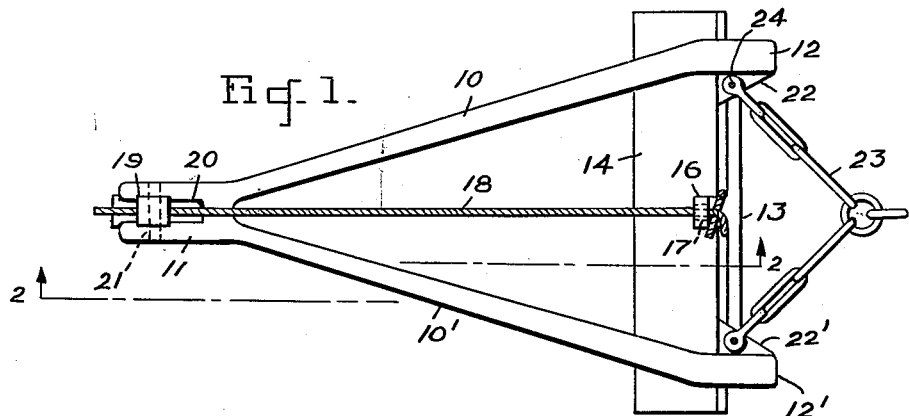
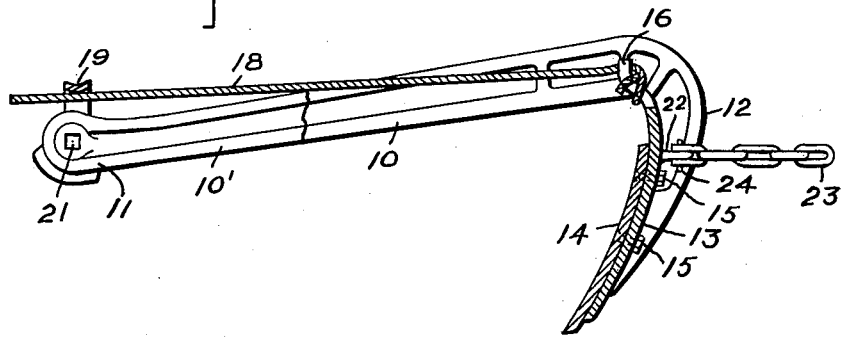
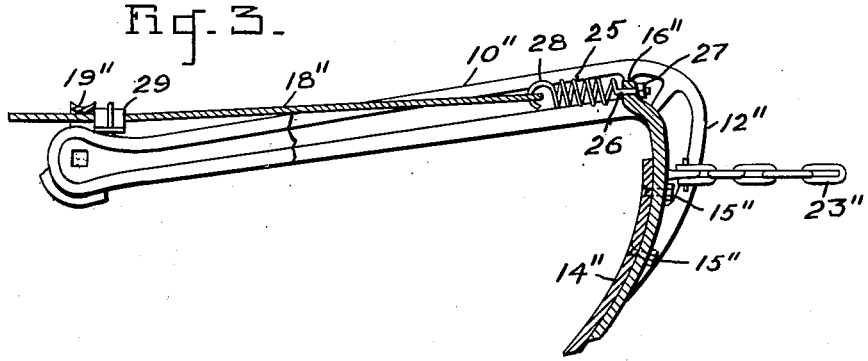
INVENTOR.
ROBERT HENDERSON
WILLIAM K. McGLOTHLIN
BY Stowell & Evans
Attorneys April 14, 1953 R. HENDERSON ET AL 2,634,521
DRAGLINE SCRAPER
Filed June 2, 1948 2 SHEETS—SHEET 2
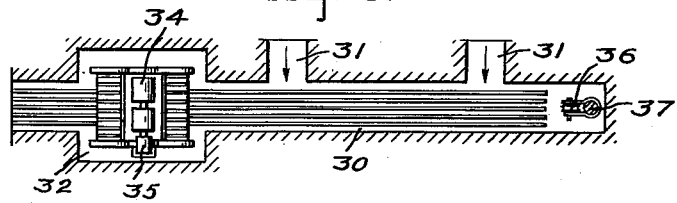
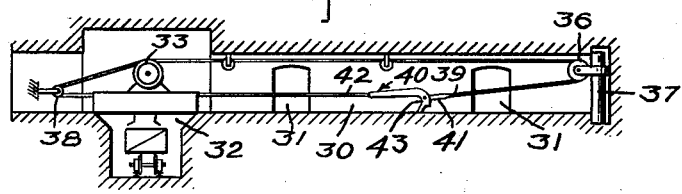
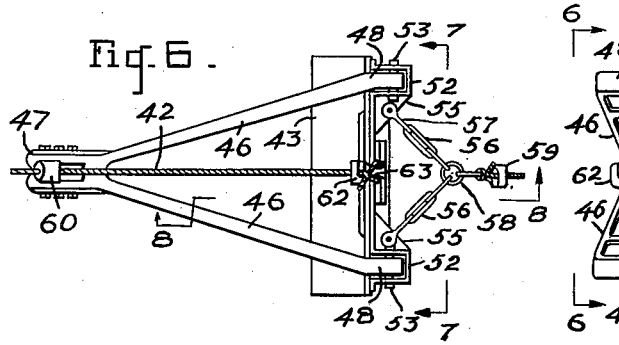
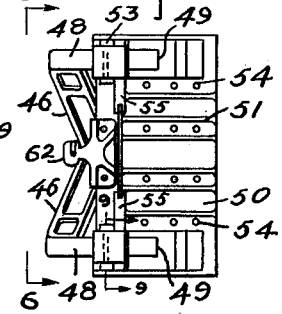
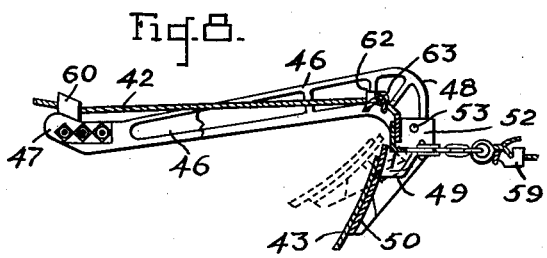
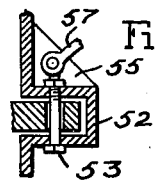
INVENTOR.
ROBERT HENDERSON
WILLIAM K. MC. GLOTHLIN
BY Stowell & Evans
Attorneys

Patented Apr. 14, 1953  2,634,521

UNITED STATES PATENT OFFICE 2,634,521

DRAGLINE SCRAPER

Robert Henderson and William K. McGlothlin, Climax, Colo.

Application June 2, 1948, Serial No. 30,673

12 Claims. (Cl. 37—147)

This invention relates to drag line scrapers.

An object of the invention is to provide a drag line scraper that may be used to advantage for the scraping of downhill slopes as well as for the scraping of level ground and up-grade slopes.

Another object is to provide a scraper in which the scraper blade is subjected by tension on the drag line to a force tending to rotate the scraper blade into the ground.

Another object is to provide a scraper in which drag line tension is applied first to the scraper blade to rotate the latter into the ground to obtain an effective initial bite and thereafter to the scraper to drag the same with its load towards a discharge point.

Another object is to provide a drag line scraper in which the scraper blade can be readily replaced when worn.

Yet another object is to provide a drag line scraper wherein the frame is supported by the scraper blade and the drag line is attached to the scraper blade and led forwardly through a guide on the scraper frame.

A further object of the invention is to provide a scraper in which the scraper blade or back plate is attached to the scraper arms by pivots in such a manner that, when the scraper is moved rearwardly, the blade will fold forwardly and upwardly permitting the scraper to slide over the material.

Another object is to provide a drag line scraper in which the center of gravity will be lower when the scraper is moved rearwardly than when it is moved forwardly.

Typically, the drag line scraper of the invention includes a scraper blade and a frame supported by the scraper blade, drag line anchor means on the scraper and means actuated by drag line tension to rotate the bottom of the scraper blade in a direction away from the direction of pull of the drag line. Preferably, the scraper includes drag line guide means on the scraper spaced from the drag line anchor means, more particularly positioned on the frame forwardly of the drag line anchor means.

Advantageously, the scraper blade may be pivoted to the frame on an axis transverse thereto for swinging movements forwardly about the pivot axis to a closed position and rearwardly about the axis to an open position. In such case, means limiting the rearward swinging movement of the blade is provided.

The invention will be described with greater particularity and other objects and advantages thereof will be pointed out or apparent as the description proceeds, reference being made to the accompanying drawings in which:

Fig. 1 is a plan view of one form of scraper in accordance with the invention;

Fig. 2 is a vertical sectional view taken along the line 2—2 of Fig. 1;

Fig. 3 is a vertical sectional view similar to the view of Fig. 2 of a modified form of the scraper;

Fig. 4 is a horizontal sectional view of a slusher drift showing the positions of the slusher hoist and tail block;

Fig. 5 is a vertical sectional view of the slusher drift of Fig. 4 showing a drag line scraper in the drift;

Fig. 6 is a plan view of another form of scraper looking through the plane 6—6 of Fig. 7;

Fig. 7 is an end elevation looking in the direction of arrows 7—7 of Fig. 6;

Fig. 8 is a section taken on the line 8—8 of Fig. 6; and

Fig. 9 is a section taken on the line 9—9 of Fig. 7.

Referring to the drawings, particularly to Figs. 1 and 2 thereof, the drag line scraper shown has a frame including rearwardly diverging arms 10—10' united at the front to provide a nose portion 11. The frame arms are curved downwardly at the rear to provide depending mounting members 12—12'. A back plate 13 is secured to the forward faces of the mounting members as by welding and a scraper blade 14 is secured to the forward face of the back plate as by screws 15, for example.

It will thus be seen that the scraper blade 14 may be removed from the back plate 13 by unfastening the screws 15 and may be replaced by a new blade when badly worn.

In effect, the blade and back plate may be considered as a unit having an upstanding drag line anchor 16 centrally positioned at the top of the back plate. The anchor has an eye 17 through which the tail of the drag line 18 is passed and to which the drag line is hitched, as shown.

At the forward end of the scraper frame a drag line guide having an upstanding eye 19 is positioned in a slot 20 in the nose 11. A pin or key 21 retains the guide member in the slot. The drag line 18 passes forwardly from the anchor 16 through the eye 19 of the guide and to the drum of a hoist or to other pulling mechanism, as shown in Fig. 5.

Gusset plates 22—22' are provided at the rear of the scraper and a chain yoke 23 is attached to the gusset plates by bolts 24. A haul-back cable, as shown in Fig. 5, may be secured to the yoke for returning the scraper to a starting position.

In operation, the pull of the drag line on the scraper assembly at the point of attachment rotates the assembly in a direction to cause the bottom of the scraper blade to rotate in a direction away from the direction of pull of the drag line thereby causing the blade to dig into the material to be moved. This action is particularly important when the scraper is working on the downward face of a pile of material. This rotative movement is limited by the lifting action of the drag line on the forward end of the frame, and the result of the rotative action of the drag line on the scraper assembly and its lifting action on the forward end of the frame is to cause the scraper to take up a substantially uniform full load of material whether it is working up or down a slope or on substantially level ground.

In this connection, the drag line guide 19 plays an important part in maintaining the blade oriented transversely to the direction of motion of the scraper while transmitting vertical components of force between the nose of the scraper to the drag line. The principal tension component of the drag line is applied to the anchor member 16.

The scraper of Fig. 3 is similar to that shown in Figs. 1 and 2. Double primed reference numerals in Fig. 3 designate parts corresponding to parts designated by the same but unprimed numerals in Figs. 1 and 2.

In the scraper of Fig. 3, the drag line 18″ is not hitched directly to the anchor 16″. Instead, a helical spring 25 has a threaded shank 26 extending through the eye of the anchor and secured therein by a nut 27. The forward end of the spring has a hook 28 to which the drag line is hitched.

The drag line is passed forwardly through the nose guide 19″. A stop member 29 is clamped or otherwise firmly secured to the drag line rearwardly of the nose guide and is so positioned on the drag line that the spring 25 must be stretched a substantial amount by tension of the drag line before the stop 29 engages the rear of the nose guide 19″, as shown in Fig. 3.

Operation of the modified form of scraper shown in Fig. 3 is similar to the operation of the device of Figs. 1 and 2 except that initial pulling force is gradually applied to the scraper through the spring 25, which stretches as the pulling force is increased and ultimately allows the stop member 29 to engage the nose guide 19″ and transfer some of the pulling force to the nose of the scraper. The stop member effectively limits the tension applied to the spring and correspondingly limits the digging torque applied to the scraper.

The provision of a spring connection as in Fig. 3 adapts the scraper to work on loose gravel piles, in which use a scraper without the spring connection would tend to bury itself in the gravel.

It will be understood that the spring could be of the compression type if placed on the rearward side of the anchor 16″.

Referring now to Figs. 4 and 5, a brief description will be given of the operation of a scraping system employing the scraper of the invention in the slusher drift of a mine.

In Figs. 4 and 5, reference numeral 30 designates a slusher drift into which material is delivered through the laterally inclined fingers 31. The hopper is indicated by reference numeral 32, and the slusher hoist by reference numeral 33. No attempt is made to show the actual construction of the hoist as this is conventional, comprising, as it does, one or more drums 34 that are rotated by means of a motor 35. Positioned at one end of the slusher drift is a tail block 36 that is firmly anchored to a post 37 in the manner indicated in Fig. 5. A head block 38 may be suitably anchored on the other side of the slusher hoist if necessary, as indicated in Fig. 5.

The haul back cable is designated by reference numeral 39. The scraper is indicated in a general way in Fig. 5, where it is designated in its entirety by reference numeral 40. The haul back cable is connected to one of the hoist drums and passes around the tail block 36 and is then connected at 41 to the rear end of the scraper. The nose or haul cable 42 is fastened to a hoist drum and taken through the head block 38, if necessary, or direct to the scraper and through the haul cable guide 60 on the nose of the scraper and fastened to the back plate at 62 as shown in Fig. 8. The haul cable can slide freely through the guide 60, thereby guiding the nose of the scraper while pulling substantially entirely on the back plate. The scraper wearing blade is designated by reference numeral 43.

By operating the hoist first in one direction and then the other, it is evident that the scraper can be moved towards and away from the discharge point, and since the head block is on the other side of the discharge point from that of the tail block, the scraper can be moved to a position directly over the discharge point.

Having thus described in a general way the manner in which the scraper is operated in a slusher drift, the construction of the scraper of Figs. 6 through 9 will now be described in detail.

In the drawing, Figs. 6-9, reference numerals 46 designate the scraper arms which are united at the front end 47, which is referred to as the nose, and diverge rearwardly terminating in downwardly extending hook portions 48 which terminate at points 49, as shown in Figs. 7 and 8. The scraper blade includes a back plate 50 which is preferably a steel casting provided with a plurality of reenforcing ribs or beams 51. At the sides of the back plate are rearwardly extending loops 52 through which the ends 48 of the scraper arms extend as shown in Figs. 6, 7, 8, and 9. Pivot bolts or pins 53 extend through the walls of loops 52 and through openings in the downwardly extending ends 48 of the scraper arms. Any connection between the arms and the back that permits the back to fold in relation to the arms and also holds the back in digging or open position may be substituted for the one shown. The parts are so arranged and proportioned that the back plate can fold upwardly into a position adjacent the lower surfaces of the scraper arms, as indicated by broken lines in Fig. 8. The replaceable steel lines or digging plate 43 is secured to the back plate by bolts 54 in such a manner that it can be removed and replaced when it is worn to such an extent as to require renewal. At this point attention is called to the fact that plate 43, which takes the major part of the wear, can be replaced without any serious amount of labor or expense, whereas in some of the former constructions of scrapers, it has been necessary to scrap the entire scraper whenever the scraper blade has become badly worn.

Gusset plates 55 are provided to which short chains 56 are connected by means of chain clevises 57. The other ends of these chains are connected with the bridle ring 58. A rope hitch 59 is also connected to the bridle ring as shown in Figs. 6 and 8. This construction provides one means for fastening the haul back line to the scraper, but any other suitable means may be used which does not interfere with the folding action of the scraper.

Secured to the nose of the scraper is a pull rope guide 60 having an hour glass shaped opening through which the haul rope 42 extends, in the manner shown in Figs. 6 and 8. Secured to the upper edge of the back plate is a haul rope hitch or anchor 62 and the rear end of the haul cable is connected to this anchor in the manner shown in Figs. 6 and 7. It will be seen that the rope is looped around the shank of the anchor and the end of the rope is placed underneath that part designated by reference numeral 63. Any type of hitch, fastened in any position, may be used so long as it controls the opening of the scraper back.

From the above description it will be seen that the scraper which forms the subject of this invention is so constructed that, when the tension in the rope is such as to move the scraper towards the tail block, the scraper blade will fold upwardly against the scraper arms, thereby permitting the scraper to slide over the material. Due to the inclination of the back plate, there is very little tendency to move the material towards the tail block. In the folded position, the center of gravity of the scraper is very low and for this reason the tendency for the scraper to tip when passing over the rough upper surface of the material is very small.

The fact that the back plate folds, prevents the scraper from dragging material towards the tail block and therefore obviates the necessity of expending a large amount of time and labor to remove material that might otherwise be brought to this position.

Let it now be assumed that the scraper has been moved as far as desired towards the tail block and that the slusher hoist is reversed to move it towards the discharge point or towards the left when viewed as in Fig. 5. The first effect of applying tension to the rope anchored at 62 is to turn the scraper blade in a counter-clockwise direction, bringing it to what may be called open position. After the blade has been brought to this position, the entire assembly acts as a unit and upon further application of tension through the drag line the scraper digs into the material which accumulates in front of the blade, causing the scraper to continue the counter-clockwise movement until stopped by the action of the drag line on the guide 60. In its further forward movement the scraper will operate in substantially the same manner as the scraper of Figs. 1 and 2. Since head block 38 and tail block 36 are positioned on the opposite sides of the discharge point, the scraper can be brought to a position directly over the discharge point. As soon as the scraper has reached its ultimate discharge position, the hoist is reversed and the scraper folds as it is moved back towards the tail block. This operation is repeated as long as necessary or desirable.

The means for attaching the haul line to the scraper so as to control the opening of the scraper or back plate when the scraper begins to move towards the discharge point may be replaced by any other suitable means, if desired, as the principal object of this is, first of all, to apply the force in such a way that it will open the scraper and bring the parts into operative position.

The fact that the scraper blade folds when the scraper is moved towards the tail block, brings the back plate into a position in which its surface forms the wearing surface for this rearward movement instead of the lip or edge of the scraper blade, as would be the case if the folding construction were not employed.

The folding of the back plate and blade keeps the material from accumulating around the tail block, thereby reducing wear on the latter.

The folding action permits digging or operation on any slope, due to the fact that the scraper can be opened to digging position at any desired place.

From the foregoing description it will be seen that, by providing the scraper with a blade that folds with respect to the scraper arms and with means for exerting a force on the blade tending to move it into operative position whenever the tension in the haul rope is exerted thereon, the amount of power required to operate the scraper is greatly reduced and it is assured that the blade will always open and move to a position in which it will gather a full load of material.

It will be understood that the several forms of the scraper shown and described herein are illustrative of the broad scope of the invention and that various modifications will occur to those skilled in the art in the light of this disclosure. For instance, it is contemplated that the spring and stop member arrangement of Fig. 3 may be incorporated in a scraper of the folding-blade type, as shown in Figs. 6–9. Still other modifications will be readily apparent.

The rotative movement of the scraper assembly under pull of the drag line that causes the bottom of the scraper blade to rotate in a direction away from the direction of pull of the drag line is limited not only by the lifting action of the drag line on the nose guide, as pointed out hereinbefore, but is also limited by any material that may be under the nose of the scraper. If the material happens to be very fine, there may not be sufficient limiting action to this rotative movement to prevent the scraper from burying itself. However, the provision of spring means in the drag line, as in the scraper of Fig. 3, for example, practically eliminates the tendency of the scraper to bury itself when working over fine material.

This application is a continuation-in-part of our copending application Serial No. 669,913, filed May 15, 1946, for Drag Line Scrapers, now abandoned.

We claim:

1. A drag line scraper comprising a scraper blade forming the main ground-engaging support for the scraper in operation, a forwardly extending frame supported by the blade, and drag line anchor means on the scraper positioned above the line joining the bottom of the scraper blade and the lowest portion of said frame to produce in cooperation with a drag line attached thereto an effective forward turning moment of the scraper about the ground-engaging portion of the blade.

2. A drag line scraper comprising a scraper blade forming the main ground-engaging support for the scraper in operation, a forwardly extending frame supported by the blade, drag line anchor means on the scraper above the bottom of the blade and drag line guide means on said frame positioned to produce in cooperation with a drag line attached thereto an effective forward turning moment of the scraper about the ground-engaging portion of the blade.

3. A drag line scraper comprising a scraper blade forming the main ground-engaging support for the scraper in operation, a forwardly extending frame supported by the blade, drag line anchor means on the scraper above the bottom of the blade and drag line guide means on the frame positioned above the line joining the bottom of the scraper blade and the lowest portion of said frame to produce in cooperation with a drag line attached thereto an effective turning moment of the scraper about the ground-engaging portion of the blade.

4. A drag line scraper comprising a scraper blade forming the main ground-engaging support for the scraper in operation, a forwardly extending frame supported by the blade, drag line anchor means on the scraper above the bottom of the blade and drag line guide means on the frame positioned above the line joining the bottom of the scraper blade and the lowest portion of said frame.

5. A drag line scraper comprising a scraper blade forming the main ground-engaging support for the scraper in operation, a forwardly extending frame pivotally supported by the blade, drag line anchor means on the scraper above the bottom of the blade and drag line guide means on the frame positioned above the line joining the bottom of the scraper blade and the lowest portion of said frame.

6. A drag line scraper comprising a scraper blade forming the main ground-engaging support for the scraper in operation, a forwardly extending frame supported by the blade, drag line anchor means on the scraper positioned above the line joining the bottom of the scraper blade and the lowest portion of said frame to produce in cooperation with a drag line attached thereto an effective forward turning moment of the scraper about the ground-engaging portion of the blade, and haul-back line attaching means on the scraper below the level of said drag line anchor means.

7. A drag line scraper comprising a scraper blade forming the main ground-engaging support for the scraper in operation, a forwardly extending frame rigidly supported by the blade, drag line anchor means on the scraper above the bottom of the blade and drag line guide means on the frame positioned above the line joining the bottom of the scraper blade and the lowest portion of said frame.

8. A drag line scraper including a scraper blade forming the main ground-engaging support for the scraper in operation, a forwardly extending frame supported by the blade, haul-back line attaching means on the back of said scraper blade intermediate the top and bottom edges thereof, drag line anchor means on said scraper blade above said haul-back line attaching means, drag line guide means on said frame forward of said drag line anchor means above the line joining the bottom of the scraper blade and the lowest portion of said frame, a drag line fastened to said anchor means and passing through said guide means, a spring member in said drag line, and means limiting the flexing of said spring member to a preselected extent.

9. A drag line scraper including a scraper blade forming the main ground-engaging support for the scraper in operation, a forwardly extending frame supported by the blade, haul-back line attaching means on the back of said scraper blade intermediate the top and bottom edges thereof, drag line anchor means on said scraper blade above said haul-back line attaching means, drag line guide means on said frame forward of said drag line anchor means above the line joining the bottom of the scraper blade and the lowest portion of said frame, a drag line fastened to said anchor means and passing through said guide means, a spring member in said drag line intermediate said anchor means and said guide means, and a stop member on said drag line positioned to engage said guide means when said spring member is flexed to a predetermined extent.

10. A drag line scraper including a scraper blade forming the main ground-engaging support for the scraper in operation, a forwardly extending frame pivotally supported by the blade for swinging movements about a horizontal transverse axis, means limiting the amount of rearward swinging movement of the blade with respect to the frame, haul-back line attaching means on the back of said scraper blade intermediate the bottom edge thereof and the pivotal axis of said frame, drag line anchor means on said scraper blade above the pivotal axis of said frame, and drag line guide means on said frame forward of said drag line anchor means above the line joining the bottom of scraper blade and the lowest portion of said frame.

11. A drag line scraper including a scraper blade forming the main ground-engaging support for the scraper in operation, a forwardly extending frame pivotally supported by the blade for swinging movements about a horizontal transverse axis, co-operating stop means on said blade and on said frame limiting the amount of rearward swinging movement of the blade with respect to the frame, haul-back line attaching means on the back of said scraper blade intermediate the bottom edge thereof and the pivotal axis of said frame, drag line anchor means on said scraper blade above the pivotal axis of said frame, and drag line guide means on said frame forward of said drag line anchor means above the line joining the bottom of the scraper blade and the lowest portion of said frame.

12. A drag line scraper including a scraper blade forming the main ground-engaging support for the scraper in operation, a forwardly extending frame comprising two arms united at their front ends to form a nose, the arms diverging rearwardly and being pivotally supported at their rear ends by the blade for swinging movements about a horizontal transverse axis, cooperating stop means on said blade and on said frame limiting the amount of rearward swinging movement of the blade with respect to the frame, haul-back line attaching means on the back of said scraper blade intermediate the bottom edge thereof and the pivotal axis of said frame, drag line anchor means on said scraper blade above the pivotal axis of said frame, and drag line guide means on the nose of said frame above the line joining the bottom of the scraper blade and the lowest portion of said frame.

ROBERT HENDERSON.
WILLIAM K. McGLOTHLIN.

References Cited in the file of this patent

UNITED STATES PATENTS

| Number | Name | Date |
| --- | --- | --- |
| 277,455 | Burket | May 15, 1883 |
| 686,203 | Campbell | Nov. 5, 1901 |
| 1,192,127 | Shostrom | July 25, 1916 |
| 1,397,751 | Allington | Nov. 22, 1921 |
| 1,437,358 | Pratt | Nov. 28, 1922 |
| 1,512,936 | Knapp | Oct. 28, 1924 |
| 1,646,536 | Housman | Oct. 25, 1927 |
| 1,668,815 | Livingston | May 8, 1928 |

FOREIGN PATENTS

| Number | Country | Date |
| --- | --- | --- |
| 675,057 | France | Oct. 28, 1929 |